US011754857B2

(12) United States Patent
Ulman

(10) Patent No.: US 11,754,857 B2
(45) **Date of Patent: *Sep. 12, 2023**

(54) EYE-MOUNTED AUTHENTICATION SYSTEM

(71) Applicant: Tectus Corporation, Saratoga, CA (US)

(72) Inventor: Morrison Ulman, Los Altos, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,819

(22) Filed: May 25, 2022

(65) Prior Publication Data

US 2022/0284731 A1 Sep. 8, 2022

Related U.S. Application Data

(63) Continuation of application No. 16/046,836, filed on Jul. 26, 2018, now Pat. No. 11,373,450.

(60) Provisional application No. 62/544,572, filed on Aug. 11, 2017.

(51) Int. Cl.
*G06V 40/19* (2022.01)
*G02C 7/04* (2006.01)

(52) U.S. Cl.
CPC ............... *G02C 7/04* (2013.01); *G06V 40/19* (2022.01)

(58) Field of Classification Search
CPC ......... G06V 40/19; G06V 10/147; G02C 7/04
See application file for complete search history.

(56) References Cited

U.S. PATENT DOCUMENTS

| | | | | |
|---|---|---|---|---|
| 6,638,314 | B1 * | 10/2003 | Meyerzon | G06F 16/951 707/E17.108 |
| 6,711,293 | B1 | 3/2004 | Lowe | |
| 7,224,822 | B2 | 5/2007 | Heacock | |
| 7,554,598 | B2 | 6/2009 | Togino | |
| 8,127,882 | B2 | 3/2012 | Johnson | |
| 8,285,003 | B2 | 10/2012 | Fujii | |
| 8,798,332 | B2 | 8/2014 | Otis | |
| 9,152,850 | B2 | 10/2015 | Mogi | |
| 9,612,456 | B1 * | 4/2017 | Pugh | G02C 11/10 |
| 2002/0109819 | A1 * | 8/2002 | Tuval | G09G 3/003 351/206 |
| 2004/0041027 | A1 | 3/2004 | Reiffel | |
| 2006/0115130 | A1 | 6/2006 | Kozlay | |
| 2006/0147095 | A1 | 7/2006 | Usher | |
| 2009/0093798 | A1 | 4/2009 | Charles | |
| 2012/0236259 | A1 | 9/2012 | Abramoff | |
| 2014/0079296 | A1 | 3/2014 | Cleland | |
| 2014/0193045 | A1 * | 7/2014 | Otis | G06V 40/19 348/78 |
| 2014/0282877 | A1 | 9/2014 | Mahaffey | |

(Continued)

FOREIGN PATENT DOCUMENTS

WO 2002007068 A1 1/2002

*Primary Examiner* — Solomon G Bezuayehu
(74) *Attorney, Agent, or Firm* — Fenwick & West LLP

(57) ABSTRACT

Authentication of a user is based on an electronic contact lens that contains a retinal scanner. The retinal scanner captures a retinal scan, which is used to authenticate the user (i.e., what a person is). The contact lens itself may also be used in the authentication process (i.e., what a person has). Authentication based on these two factors are used to control access to assets.

19 Claims, 10 Drawing Sheets antenna 120
edge of contact lens
retinal scanner 150
110
electronics modules 130

(56) References Cited

U.S. PATENT DOCUMENTS

2014/0341441 A1 11/2014 Slaby
2015/0087249 A1* 3/2015 Pugh ........................ H04W 4/50 455/90.3
2015/0148650 A1 5/2015 Pugh
2015/0261294 A1* 9/2015 Urbach .................. G02C 7/101 351/158
2015/0313467 A1 11/2015 Sakai
2015/0363786 A1* 12/2015 Kolupaev ............ G06Q 20/322 705/44
2016/0070121 A1 3/2016 Sales
2016/0183782 A1 6/2016 Yu
2016/0183796 A1 6/2016 Fukuma
2016/0188975 A1 6/2016 Cleland
2016/0353985 A1 12/2016 Haddadi
2017/0011263 A1 1/2017 Andersen
2017/0020441 A1 1/2017 Flitsch
2017/0024555 A1* 1/2017 Flitsch .................... H04L 67/12
2017/0026790 A1 1/2017 Flitsch
2017/0091550 A1 3/2017 Feng
2017/0097519 A1* 4/2017 Lee ........................ A61B 3/113
2017/0270636 A1 9/2017 Shtukater
2018/0032813 A1 2/2018 Lee
2018/0070819 A1 3/2018 Kanamori
2018/0084995 A1 3/2018 Wang
2018/0146050 A1 5/2018 Tanaka
2018/0160898 A1 6/2018 Yoo
2018/0210235 A1* 7/2018 Boss ...................... G02C 11/10
2018/0224669 A1* 8/2018 Shtukater ................. G02C 7/04
2018/0232507 A1 8/2018 Zizi
2018/0324177 A1 11/2018 Wang
2019/0050643 A1 2/2019 Ulman

* cited by examiner

EYE-MOUNTED AUTHENTICATION SYSTEM

CROSS-REFERENCE TO RELATED APPLICATION(S)

This application is a continuation of U.S. patent application Ser. No. 16/046,836, "Eye-Mounted Authentication System," filed Jul. 26, 2018; which claims priority under 35 U.S.C. § 119(e) to U.S. Provisional Patent Application Ser. No. 62/544,572, "Authentication System," filed Aug. 11, 2017. The subject matter of all of the foregoing is incorporated herein by reference in their entirety.

BACKGROUND

1. Technical Field

This disclosure relates generally to authentication using an eye-mounted device.

2. Description of Related Art

Authentication is necessary for controlling access to computers, tablets, smart phones, vehicles, money (e.g. automated tellers, wired funds), health records, military hardware and many other assets.

Entering passwords, especially into web pages, is a ubiquitous authentication task of modern life. "Collectively, humans spend the equivalent of more than 1,300 years each day typing passwords, according to Cormac Herley, a principal researcher at Microsoft Corp." (from: "The Man Who Wrote Those Password Rules Has a New Tip: N3v$r M1^d!", by Robert McMillan, The Wall Street Journal, Aug. 8, 2017.) Password chores can be made easier by a password manager that reduces password recycling and promotes the use of long, randomly generated passwords.

Authentication may depend upon what a person knows, what a person has, what a person is, or some combination of the three. For example, a master password to a password manager is something that a person knows. Two-factor authentication may be based on something a person has, such as a smart phone running a time-based, one-time password algorithm.

An authentication scheme based on an iris scanner is an example of authentication by what a person is since the pattern of one's irises is unique, like a fingerprint. Lying somewhere between has and is, is a radio-frequency identification (RFID) chip installed subcutaneously in a person's hand. Waving the chip-containing hand in front of an RFID reader is then sufficient to open doors or complete a credit card transaction.

Another authentication scheme in the "what a person is" category is based on imaging the unique pattern of blood vessels and other features of the fundus of the eye. The fundus includes structures such as the retina, optic disc, macula, fovea and posterior pole.

Patterns of the retina are a desirable trait upon which to base authentication because they are unique to each eyeball and do not change over time. Furthermore, the retina is difficult to observe and therefore relatively secure from unauthorized copying. This is in contrast to the iris which is observable at useful resolution from several meters away.

The retina being hard to observe makes it attractive for authentication applications, but at the same time makes its use inconvenient. Goggles and head-mounted display helmets have been proposed as platforms for retina scanners. However, they are bulky, heavy and far from discreet.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1:
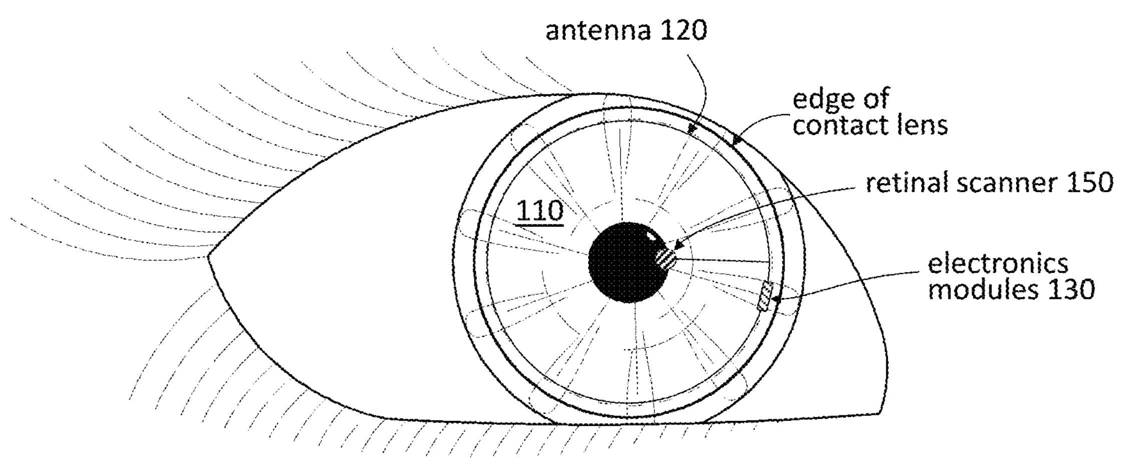
FIG. 1 shows a person's eye wearing an electronic contact lens.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Authentication of a user is based on an electronic contact lens that contains a retinal scanner. The retinal scanner captures a retinal scan, which is used to authenticate the user (i.e., what a person is). The contact lens itself may also be used in the authentication process (i.e., what a person has). Authentication based on these two factors are used to control access to assets.

The authentication processes and resulting access authorization may occur on the contact lens, off the contact lens, or remotely away from the user. In some applications, the authentication based on the retinal scan captured by the electronic contact lens may occur on-contact-lens, for example by comparing the retinal scan with retinal scans stored in memory on the contact lens. In other applications, the authentication based on the retinal scan may occur off-contact-lens, for example by transmitting the retinal scan to a necklace worn by the user. The necklace then performs the authentication. Authentication may also be performed remotely, for example by cloud-based services rather than by a necklace on the user's body. The authentication may be based on data derived from the retinal scan, rather than the actual retinal scan itself. The data used for authentication is referred to as authentication data.

In another aspect, certain authentication data may be used for the retinal scan and separate authentication data for the electronic contact lens, with separate processes for each. Alternatively, the two factors may be combined. For example, a hash of the retinal scan may be combined with an ID for the electronic contact lens, and a single process used to authenticate the user based on both the electronic contact lens and the retinal scan.

The authentication system described herein permits automatic, secure authentication for a variety of applications. For example, a person using the system may log into web sites simply by looking at a computer screen. The system depends on both what a person has and what a person is. The person has a special contact lens and is uniquely identified by their fundus pattern. The system may generate a unique authorization string for each asset to which access is sought. Said another way, the authentication system may generate a different password for every computer, vehicle, bank account, health record, battle tank, guided missile or other asset the person is authorized to access.

In some versions, the system works only when a specific contact lens is worn on a specific eyeball. In some embodiments, the system is configured so that retinal scans are never stored in memory and never transmitted from the contact lens. Thus when the electronic contact lens is removed from the one, correct eyeball, it becomes inoperative for authentication.

Figure 2:
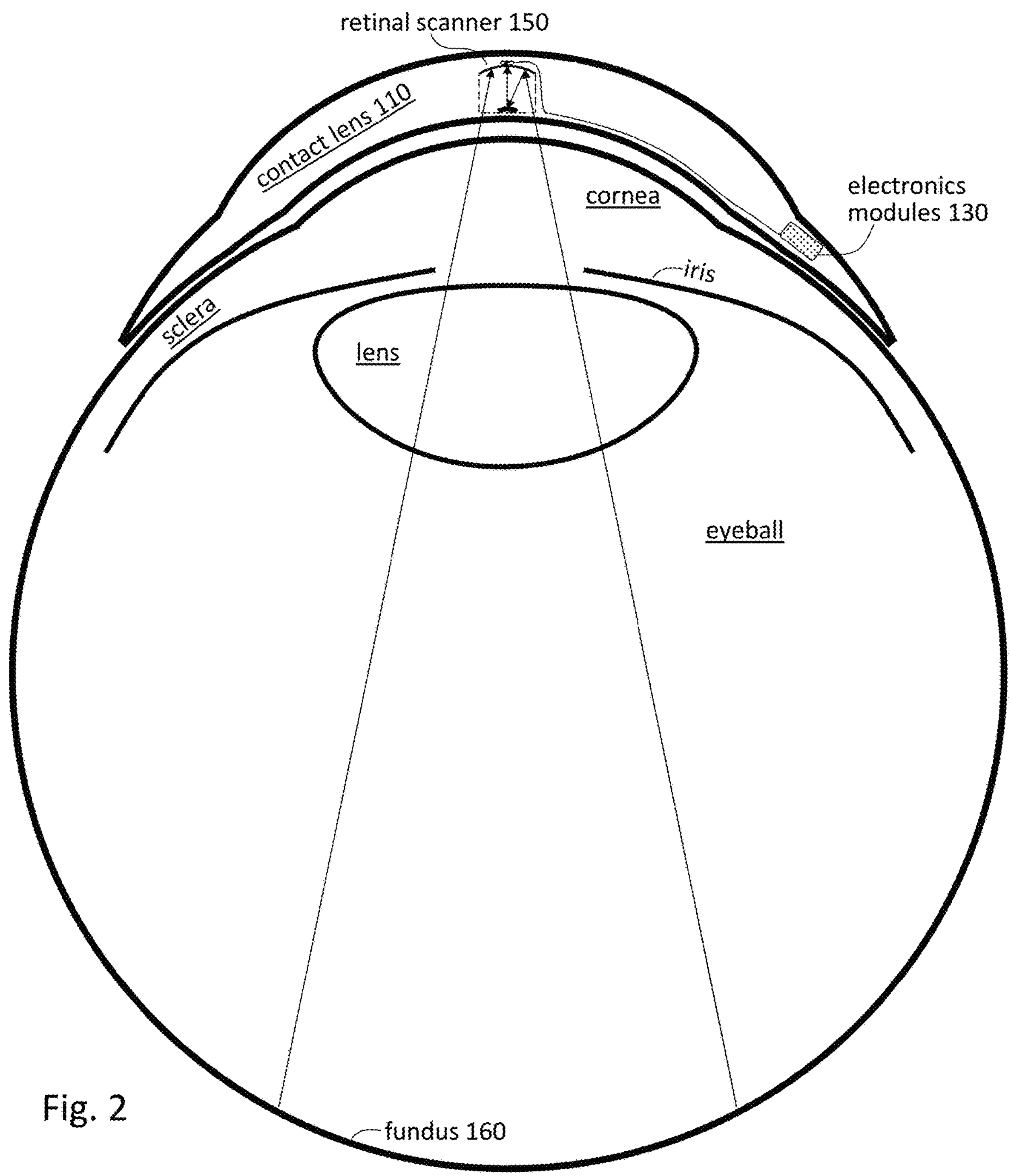
FIG. 2 is a cross-sectional view of an electronic contact lens mounted on an eye.

FIG. 1 shows a person's eye wearing an electronic contact lens 110. FIG. 2 is a schematic, cross-sectional view of the electronic contact lens 110 mounted on the eyeball. The lens 110 includes a coil or antenna 120, electronics modules 130 and a retinal scanner 150. The antenna 120 may receive both power and data via radio-frequency electromagnetic waves. It may also transmit data. The electronic modules 130 may include power management integrated circuits (IC), communications ICs, microprocessor ICs and/or application specific ICs (ASICs). The retinal scanner 150 captures images of the user's fundus 160, which are used to authenticate the user. User authentication may also be based on the electronic contact lens itself, such as the serial number for the electronic contact lens. The terms "fundus image," "retinal image," and "retinal scan" are used interchangeably herein. Retinal scanners are described in U.S. application Ser. No. 15/898,157, "Contact Lens with Retinal Camera," which is incorporated herein by reference. In an embodiment, as illustrated in FIG. 2, the electronic contact lens is a scleral lens. It rests on the sclera and is separated from the cornea by a tear layer roughly 100 to 200 um thick.

Figure 3:
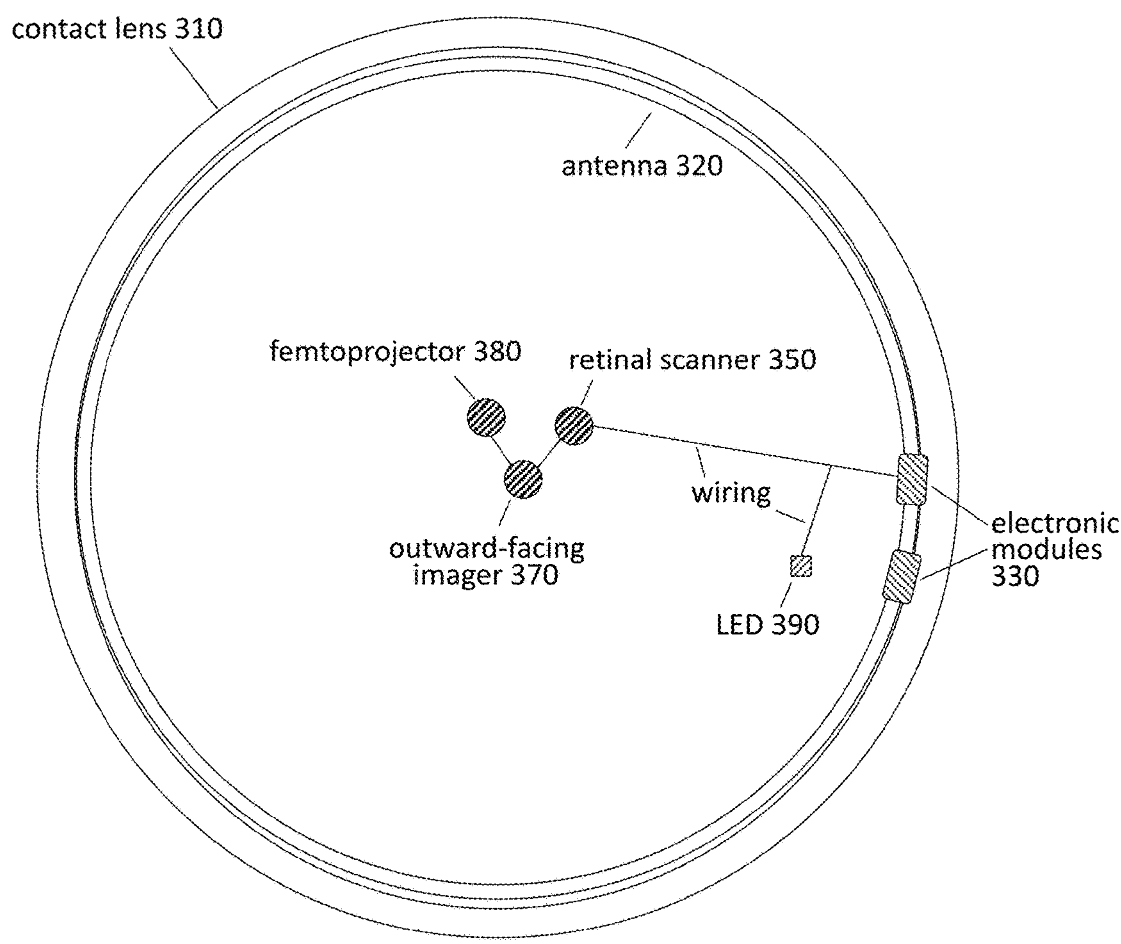
FIG. 3 is a view of an electronic contact lens illustrating various lens components.

FIG. 3 is a view of an electronic contact lens 310 illustrating various lens components, including additional components not shown in FIG. 1 or 2. For example, the lens of FIG. 3 includes an outward-facing imager 370 as well as a retinal scanner 350. In an embodiment, a contact lens may include such an outward facing imager 370 for capturing images of whatever a person is looking at and/or for receiving optical communications from an optical transmitter. Advanced optics for outward facing imagers have been described by Lemoff and Wiemer (e.g., see U.S. application Ser. No. 16/001,778, "Folded Optical Designs for Eye-mounted Cameras" and Ser. No. 16/034,761, "Advanced Optical Designs For Eye-Mounted Imaging Systems", which are incorporated herein by reference).

A femtoprojector 380 is also illustrated in FIG. 3. Femtoprojectors were proposed by Deering (e.g., see U.S. Pat. No. 8,786,675, "System using Eye Mounted Displays"). Advanced femtoprojector optics have been described by Miller and Lemoff et al. (e.g., see U.S. application Ser. No. 15/570,707, "Femtoprojector Optical Systems" and Ser. No. 15/985,511, "Advanced Femtoprojector Optical Systems"). All of the foregoing are incorporated herein by reference. A femtoprojector is a small video projector—so small that it fits inside a contact lens. The femtoprojector projects images through a person's eyeball onto the person's retina. A femtoprojector may therefore be part of a contact-lens-based display system. Such displays are simultaneously small, lightweight and capable of displaying high resolution images. In an embodiment, a contact lens may include a femtoprojector for displaying information to a lens wearer.

A light emitting diode (LED) 390 is also illustrated in FIG. 3. In various embodiments a contact lens may include an inward-facing LED, an outward-facing LED, or both. An inward-facing LED may be included in a lens to provide illumination for fundus images. An inward-facing LED may emit light at visible or infrared wavelengths. Similarly a retinal scanner 350 may be sensitive to visible or infrared wavelengths, or both. An inward-facing facing LED may be integrated with a retinal scanner. An outward-facing LED may be included in a lens for transmitting optical communications to an optical receiver.

Figure 4:
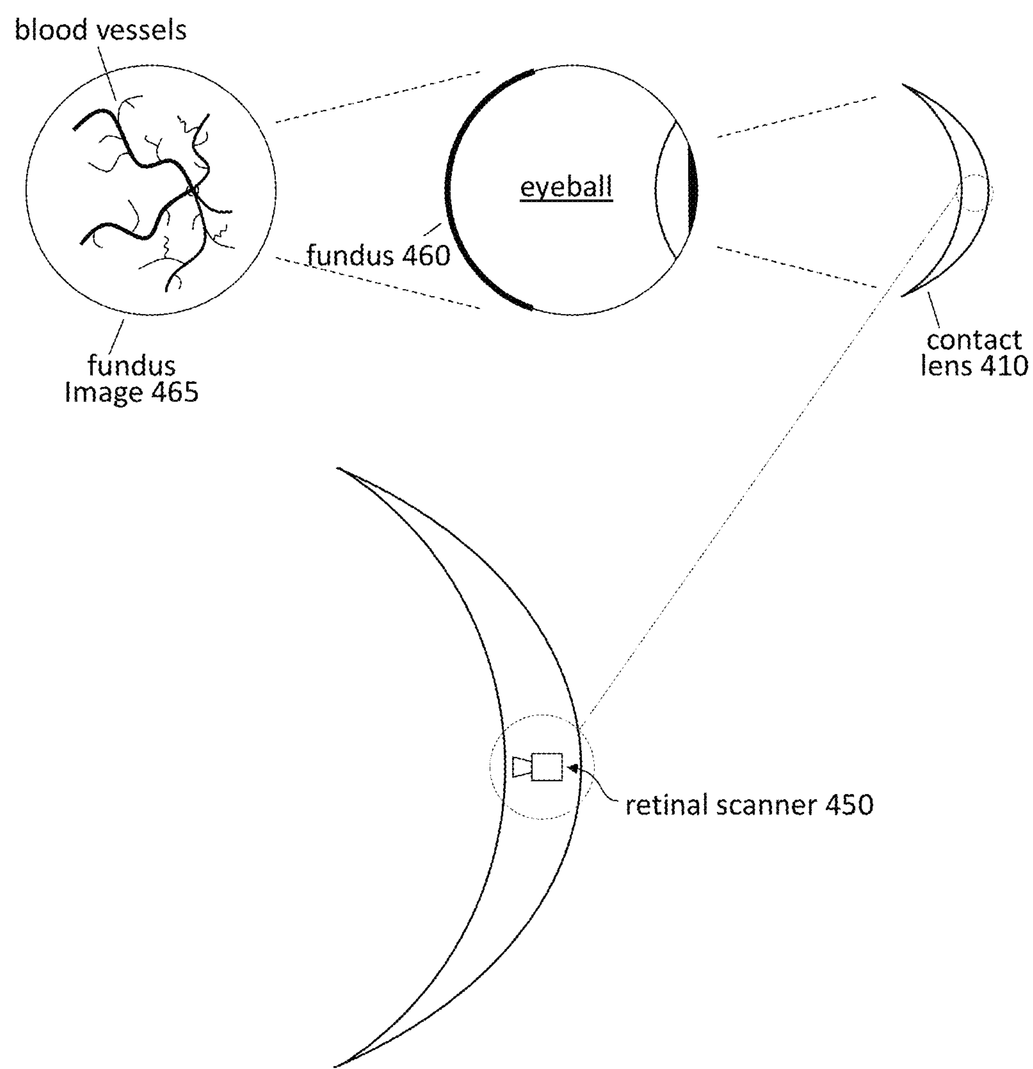
FIG. 4 is a schematic illustration of fundus image capture using an electronic contact lens.

FIG. 4 is a schematic illustration of fundus image capture using an electronic contact lens. The figure shows an exploded view including: an eyeball, a simulated fundus image 465 of the eyeball, a contact lens 410 that fits the eyeball, and a close-up view of the contact lens illustrating a retinal scanner 450. The fundus image 465 is captured by the retinal scanner. In some embodiments, an inward facing LED may be included in the contact lens to provide illumination for fundus images. For example, an inward-facing, infrared LED mounted in a contact lens may shine low-intensity infrared light into a person's eyeball. Reflection of infrared light from the fundus 460 reveals a pattern of blood vessels unique to each eyeball because the blood vessels absorb the light more readily than the surrounding tissue. If no LED illumination is provided, a retinal scanner may still obtain a fundus image illuminated by ambient light.

Figure 5A:
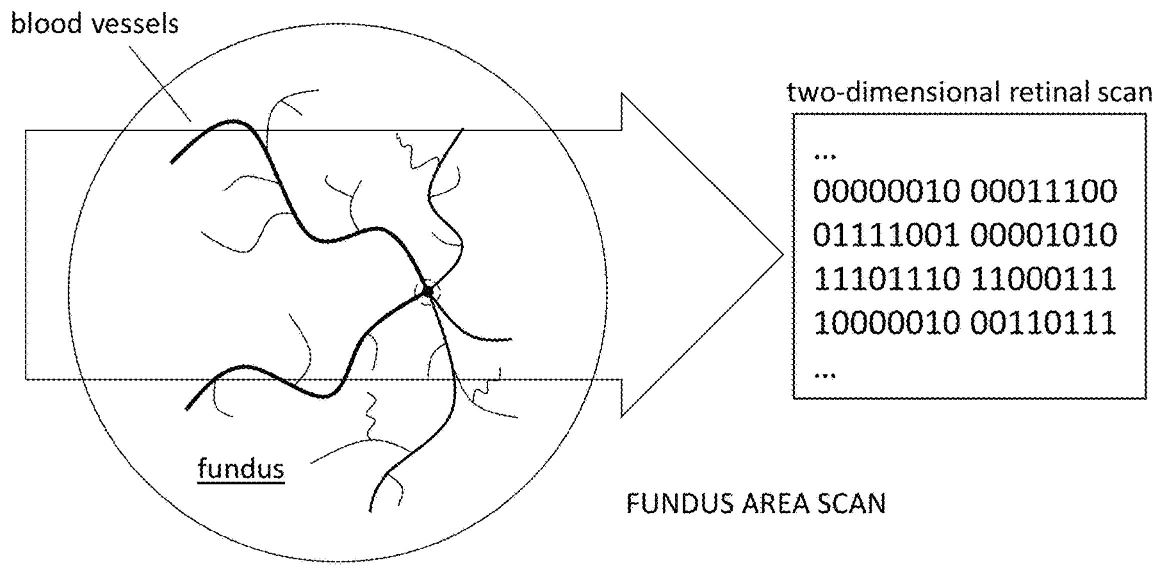
FIG. 5A is a schematic illustration of two-dimensional fundus image capture.
Figure 5B:
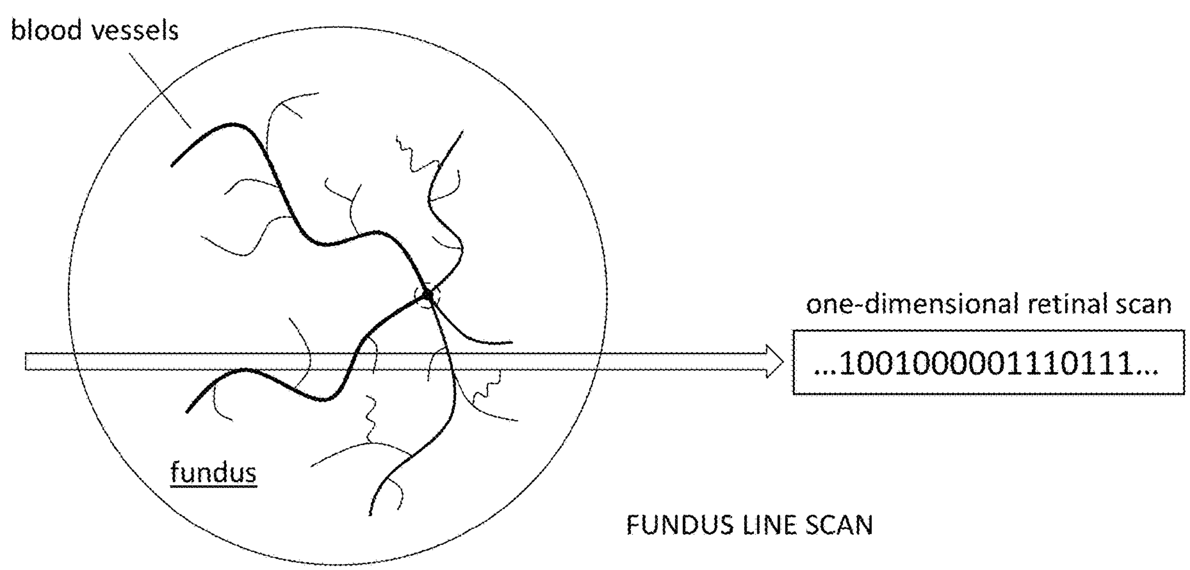
FIG. 5B is a schematic illustration of one-dimensional fundus image capture.

FIGS. 5A and 5B are schematic illustrations of two-dimensional and one-dimensional image capture, respectively. In FIG. 5A, a two-dimensional fundus image obtained by a retinal scanner in a contact lens is captured as digital data representing light intensity in one or more color channels (e.g. red, green, blue, infrared, etc.). Two-dimensional fundus images may be captured by a retinal scanner that includes a two-dimensional sensor array, or that includes a one-dimensional sensor array that is scanned along the second dimension, or that includes a single sensor that is scanned along two dimensions.

In FIG. 5B, a one-dimensional image, or line scan, obtained by a retinal scanner in a contact lens is captured as digital data representing light intensity in one or more color channels. The retinal scanner may include a one-dimensional sensor array that captures a corresponding line image of the fundus. A retinal scanner that obtains only one-dimensional or line-scan images may have a simpler design than a retinal scanner that is capable of obtaining two-dimensional images. A line-scan retinal scanner may have only a linear photodetector array, for example, instead of a two-dimensional array.

Alternatively, a two-dimensional area of the fundus may be imaged onto the one-dimensional sensor array, for example by use of a cylindrical lens. In another approach, a single sensor may be scanned across the fundus to capture the one-dimensional image. Two-dimensional sensor arrays may also be used, for example different rows in the array may use different spectral filters so that the retinal scanner captures a multi-spectral retinal scan.

FIGS. 6-10 illustrate different systems and applications that authorize access to assets based on successful authentication of the user from the retinal scan and electronic contact lens.

Figure 6:
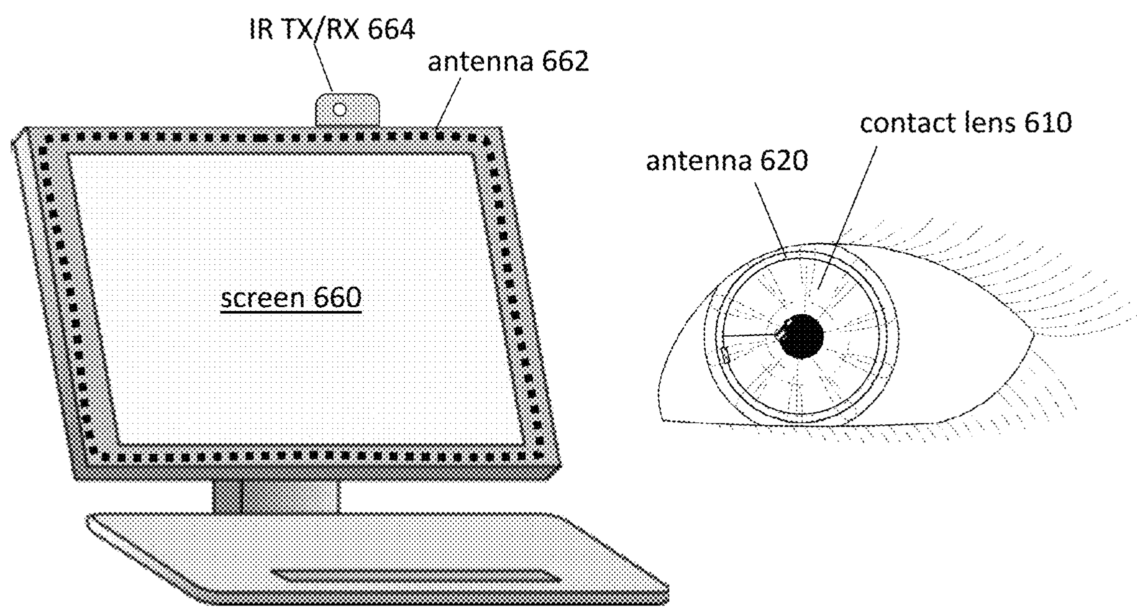
FIG. 6 shows an authentication system interacting with a display screen.

FIG. 6 illustrates an authentication system interacting with a display screen 660 to grant access to a computer system. In FIG. 6, a person (only eyeball shown) wears an electronic contact lens 610 such as a lens of FIGS. 1-4. The lens 610 includes a radio-frequency antenna 620 and may also include an outward-facing LED and/or an outward-facing imaging system. The antenna 620 may be configured to receive electromagnetic energy to provide electrical power to the lens. In addition, the antenna may receive data signals. In some embodiments, data signals may be encoded as modulation of a radio frequency carrier signal that provides power to the lens 610.

The display screen 660 also includes a radio frequency antenna 662. For example, a display screen may include a loop, dipole, Yagi or other type of radio antenna. Such an antenna 662 may be hidden in the enclosure or frame of the display or it may be a separate component connected to a display or ancillary equipment associated with a display. The display screen may also include an optical transmitter, receiver or transceiver. Optical communications equipment may be hidden in the enclosure of a display or provided in a separate package. An infrared communications system 664, for example, may be hidden behind a low-pass or band-pass infrared filter that appears dark to the unaided eye. An optical transceiver may include an LED and a photodiode.

Figure 7:
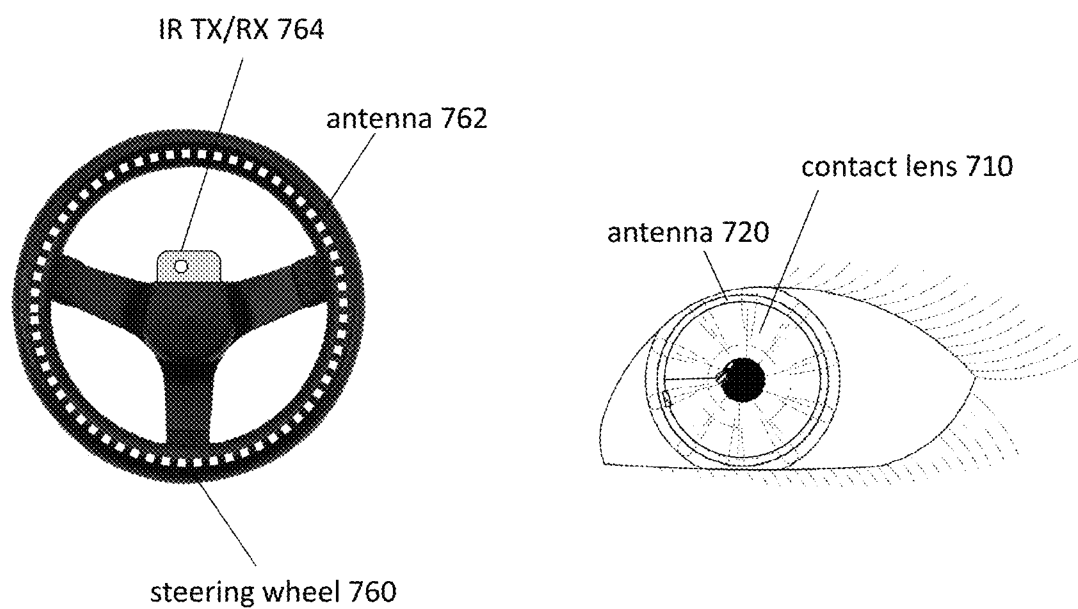
FIG. 7 shows an authentication system interacting with a steering wheel.

FIG. 7 illustrates an authentication system interacting with a steering wheel 760 to grant access to a vehicle. The scenario illustrated in FIG. 6 is similar to that of FIG. 7, except that the asset to which a person seeks access is a vehicle having a steering wheel rather than a computer system having a screen. The steering wheel 760 contains an antenna 762 and/or an optical transceiver 764. Of course, a vehicle may have an antenna and/or optical transceiver mounted somewhere other than its steering wheel. Communications components may be mounted in a dashboard, door or other part of a vehicle, as examples.

Figure 8:
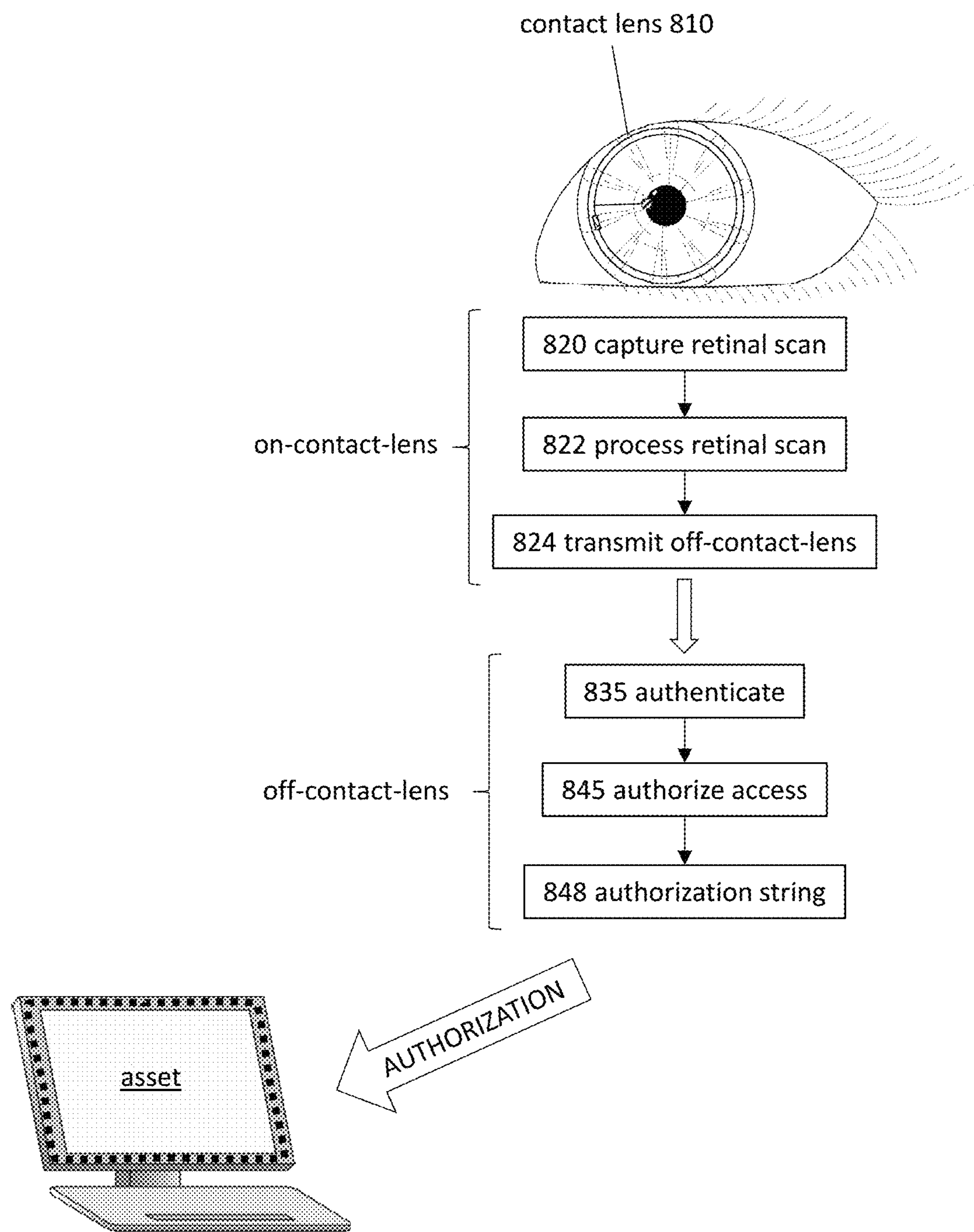
FIGS. 8, 9 and 10 are additional examples of authentication processes.
Figure 9:
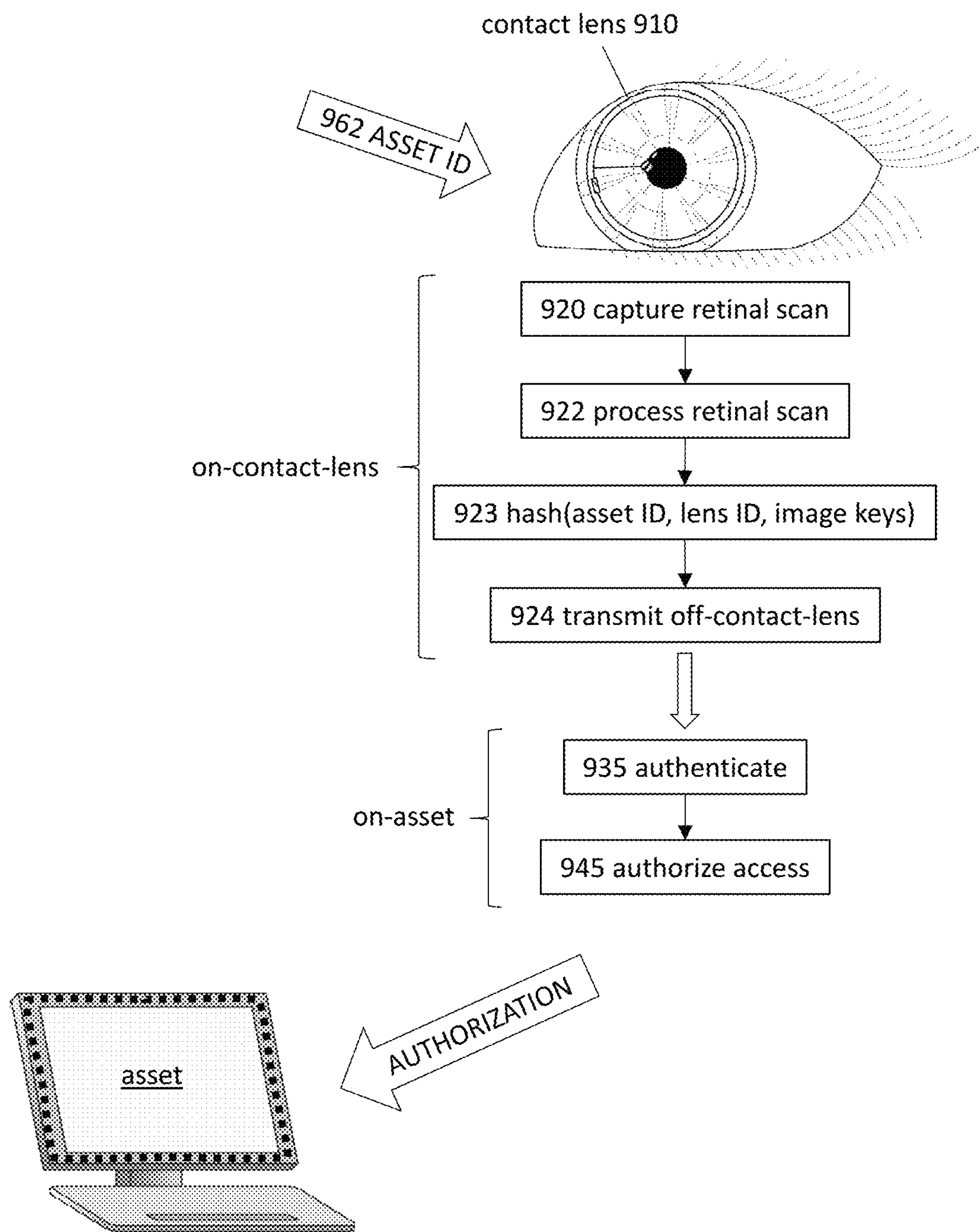
Figure 10:
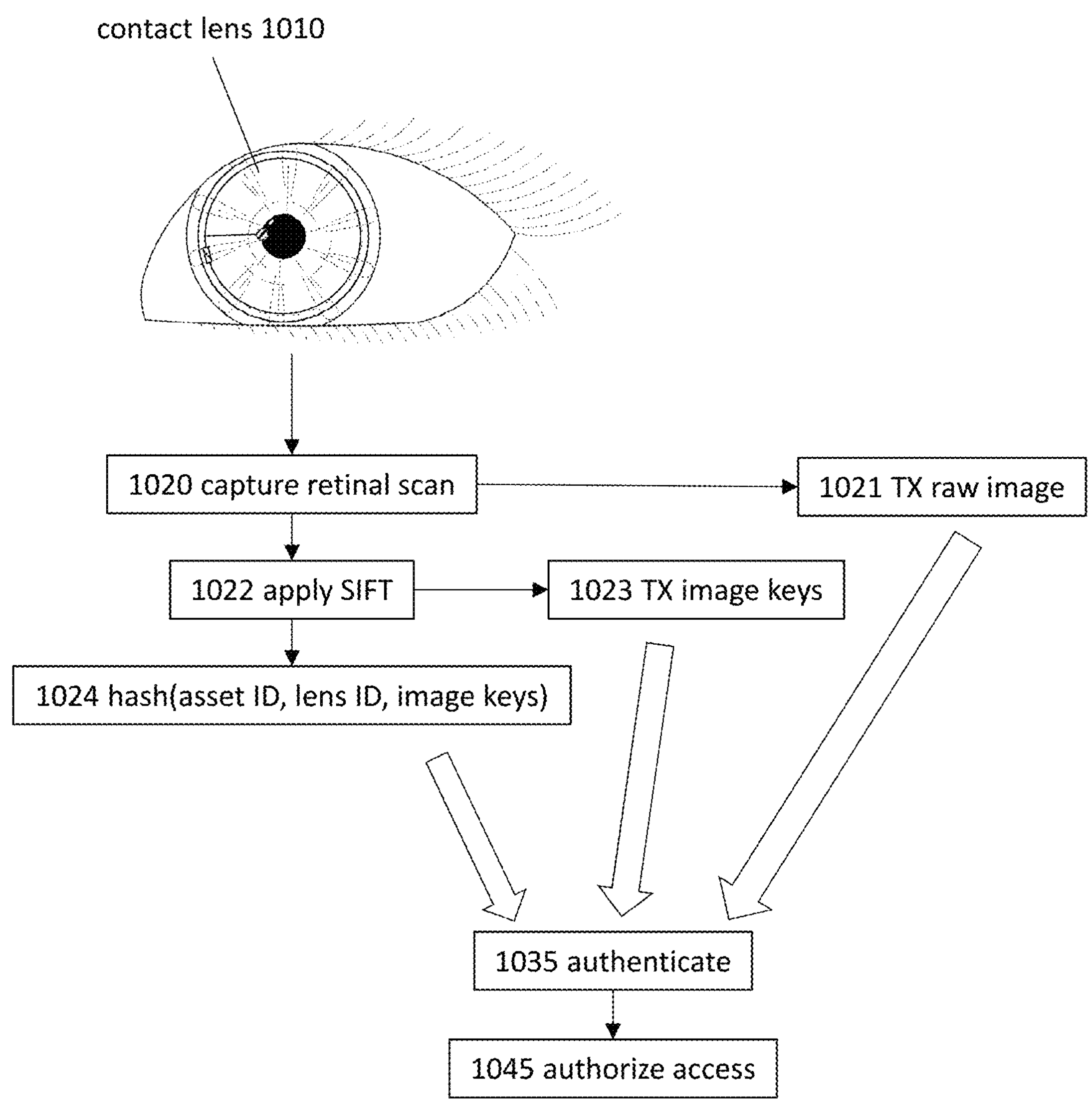

FIGS. 8, 9 and 10 illustrate examples of authentication system operation. In the example of FIG. 8, an electronic contact lens 810 captures 820 a fundus image and transmits 824 the image data to an external device for authentication of the user. Optionally, the fundus image may be processed 822 by electronics in the contact lens (on-contact-lens processing) and the processed data, rather than the raw image, transmitted 824 off-contact-lens for authentication of the user. For convenience, the data used to authenticate the user based on the retinal scan is referred to as retinal scan authentication data. Examples include the fundus image itself, features extracted from the fundus image, data derived from the fundus image (e.g., a hash of the image), and compressed or encrypted versions of any of the foregoing. The data may be transmitted via radio or optically, as described in FIGS. 6-7.

The external processing for authenticating 835 the user may take place in the device to which access is desired, such as a display terminal or steering wheel of a vehicle. It may take place in a necklace, belt, armband, wrist piece or other components that may be part of the contact lens system. Alternatively, authentication may be performed in a separate device such as a smart phone, smart watch or tablet. It may also occur remotely from the user's body, for example using cloud services. Here, in addition to authentication 835, some or all of the steps used to produce the authentication data may also be performed off-contact-lens.

In this case, if the user is successfully authenticated 835, the system then authorizes 845 access to the asset, such as a computer system. In one approach, this is accomplished by producing 845 an authorization string 848 that allows the person wearing the contact lens to access the asset.

As described above, the electronic contact lens 810 is a conduit for the retinal scan, which in some form is used to authenticate the user. The contact lens 810 itself may also be used to authenticate the user. For example, possession of a particular contact lens may be required as a second authentication factor. The contact lens 810 may generate additional authentication data, such as based on a serial number for the contact lens, and this contact lens authentication data may also be transmitted 824 off-contact-lens for authentication.

The contact lens authentication data and the retinal scan authentication data may be used separately in the authentication process. Alternatively, the two data may be combined and the combination used to authenticate the user. For example, the retinal scan and contact lens identification number may be processed and combined on-contact-lens, with the combination authentication data transmitted off-contact-lens in order to authenticate the user.

FIG. 9 illustrates another example of authentication system operation. In FIG. 9, as in FIG. 8, the asset to which access is desired is illustrated as a display screen. However, the authentication system is compatible with many other kinds of assets such as vehicles, automated teller machines, military equipment, door locks, etc. The asset in question, or its immediate surroundings, preferably includes an antenna for transmitting electromagnetic power to the contact lens. However, in alternate embodiments power may be supplied to the lens from other apparatus such a necklace worn by the person wearing the contact lens.

In the example of FIG. 9, the asset transmits an asset ID 962 to the lens. An asset ID may identify a display terminal or a specific internet site, as examples. An asset ID may be transmitted as data modulated on a radio frequency or optical carrier. In some embodiments the asset has an antenna that transmits a radio frequency carrier to supply power to the lens. Data may be transmitted simultaneously with power by modulating the carrier.

An asset ID may also be obtained by the lens via an outward facing imaging system on the lens. The outward facing imaging system may capture images of text, images, quick response (QR) codes, two dimensional matrix bar codes or other symbols. An image of a QR code, for example, may be quickly converted into data representing an asset ID by a processor or ASIC contained in the contact lens, for example.

The electronic contact lens 910 captures 920 an image of the fundus of the eyeball upon which the lens is mounted. The image includes patterns of blood vessels that are unique to each eyeball. The contact lens may be designed so that it does not store fundus images. In other words, all fundus image data is lost whenever the lens loses power. This prevents theft of fundus image data when the lens is not mounted on an eyeball.

The lens then processes 922 the fundus image to extract features or image keys from it using an image processing algorithm such as a scale-invariant feature transform algorithm, such as the SIFT method (U.S. Pat. No. 6,711,293) or similar approaches. A set of image keys identified by SIFT or another method may be referred to as a "reduced image". The SIFT algorithm produces the same image keys for an object when presented with different images of the object. In this case the object is the fundus or retina of the eyeball on which the electronic contact lens is mounted. Small changes in orientation of the lens upon the eyeball or in lighting of the fundus from ambient light or an inward-facing LED may lead to variations in images obtained by a retinal scanner.

However, the SIFT algorithm or related methods produce the same image keys from each similar image. Thus a set of image keys is unique to each retinal pattern and the same set of image keys is generated every time an image of the particular retinal pattern is obtained.

In the example of FIG. 9, a cryptographic hash function is applied 923 to a combination of the asset ID, the contact lens ID and the image keys. An example of a combination is a concatenation of asset ID, lens ID and image keys. Other examples of combinations are the sum or product of those data. The lens ID is a unique identifier stored in the lens when it is manufactured. In some embodiments a lens ID is optional.

A cryptographic hash function (e.g. MD5 or SHA2 hash function) takes a string of any length as input and produce a fixed-length hash value. In the example of FIG. 9, the input is a combination of the asset ID, lens ID and image keys of fundus image. It is very difficult to determine the input of a hash function given a particular output. Furthermore, given one input string, it is very difficult to find another input string that generates the same output. Finally, it is very difficult to find two input strings that generate the same output. Even one-bit changes in the input change the output drastically.

The output of the hash function is then transmitted 924 to the asset. It is referred to as authentication data. It is the "password" that permits access to the asset. The authentication data is different for every asset and cannot be reproduced without wearing the electronic contact lens on the correct eyeball. The string may also be long and difficult to guess. For example, if the input to the SHA-256 hash function is the string:

assetID=329859843, lensID=98743097, imageKey=dc8151f95f9619a9eab18d7d4bfdadd0 then the authentication data represented in hexadecimal is:

b9f277b14a85b9c2359ca8054a4741f890c336a59e8a3eeb2d6274537d815fc3 Changing the asset ID from 329859843 to 329859844, changes the hash output to:

8e6Mc27dca7c4b7dd5033bcac7b93d73f6bd990522c234e1a217134d4a7a98

In this example, this data is used to both authenticate 935 the user and grant access 945 to the asset. To determine whether the data is correct to grant access to an asset, the system may access a database of which contact lenses (identified by their lens ID) are registered to which users (identified by their retinal scan) and/or to which assets (identified by their asset ID). The database may contain hash values or other derived data, rather than the raw data. For example, a set of electronic contact lenses may be registered to a group of authorized persons and authentication may be based on whether the electronic contact lens has a correct lens ID and whether the retinal scan is for one of the authorized persons. Similarly, an electronic contact lens may be registered to a group of assets and authorization may be based on whether the electronic contact lens has a correct lens ID and whether the asset ID is for one of the assets in the group.

An asset, such as a screen, secure communications device, launch button, etc., may request authentication and/or authorization repeatedly. For example, authentication and/or authorization may be requested once per minute or even once per second. As an example, as soon as the lens wearer moves away from a screen or exits a vehicle, access may be stopped because the lens has moved too far away.

The contact lens may also include a time-based one-time password algorithm to change its lens ID as a function of time. A timestamp may be supplied to the contact lens by the asset or other device that transmits power and data to the lens.

Electrical power is limited on the contact lens. Therefore, instead of employing a general purpose microprocessor to perform SIFT or other algorithms (e.g. RIFT, G-RIF, SURF, PCA-SIFT, GLOH, Gauss-SIFT, etc.) to generate image keys, a purpose-built ASIC may be used. Similarly, special ASICs may be designed to perform cryptographic hash functions efficiently.

FIG. 10 provides another example of authentication system operation and illustrates different options that may be included in different embodiments. As in the examples of FIGS. 8 and 9, in FIG. 10, an electronic contact lens 1010 captures 1020 a fundus image of an eyeball upon which the lens is mounted.

In some embodiments a raw fundus image is transmitted 1021 by the lens to an external device after fundus image capture. In other embodiments a feature recognition algorithm (e.g. SIFT, etc.) is performed 1022 on the image in an application specific integrated circuit contained in the lens. Image keys, but not raw image data, are transmitted 1023 to an external device. In still other embodiments, a cryptographic hash function is applied 1024 to a combination of an asset ID, a lens ID and the image keys. In some embodiments either the asset ID or the lens ID, or both, may be omitted from the input to the hash function. The various possibilities illustrated in FIG. 10 represent tradeoffs among computational complexity and security. It is computationally simpler not to perform feature recognition on a contact lens, for example, but doing so enables a system in which the fundamental information—patterns of structures in the retina—is neither transmitted from, nor stored in a contact lens.

In addition, the various functions may occur on-contact-lens, off-contact-lens but close to the user, or remote from the user. As an example, if the electronic contact lens is registered to a specific user, the fundus image for the user may be stored in secure memory on the contact lens. Authentication based on the retinal scan may then occur on-contact-lens. As another example, if the electronic contact lens is registered to a specific asset, authorization to access the asset may occur on-contact-lens.

Further improvements may be obtained by combining the authentication schemes described above with other authentication factors. For example, an asset may require retina based authentication as described above plus voice recognition. As another example, authentication may be based on retinal scans of both eyes, not just one eye.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules, even if drawn as separate elements in the figures. For example, in FIG. 8, authentication 835 and authorization 845 may be performed by an authentication module and an authorization module, respectively. These modules may be implemented as hardware, firmware, software, and/or combinations of these. Furthermore, a single component may implement both authentication and authorization.

What is claimed is:

1. A method for authorizing user access to an asset, the method comprising:
- by an electronic contact lens:
  - capturing a retinal scan of the user's eye;
  - processing the retinal scan to produce retinal scan authentication data;
  - combining the retinal scan authentication data with other authentication data to produce combination authentication data;
  - producing a hash function of the combination authentication data;
  - transmitting the hash function of the combination authentication data from the electronic contact lens to off-contact-lens;
- authenticating the user's access to the asset based on the hash function of the combination authentication data; and
- authorizing access to the asset based on successful authentication of the user's access.

2. The method of claim 1 wherein the hash function comprises a hash function of a combination of the retinal scan authentication data with other authentication data based on an ID of the electronic contact lens and an ID of the asset.

3. The method of claim 1 wherein processing the retinal scan to produce retinal scan authentication data is invariant to changes in orientation and lighting.

4. The method of claim 1 wherein processing the retinal scan to produce retinal scan authentication data comprises applying a SIFT algorithm to produce the retinal scan authentication data.

5. The method of claim 1 wherein the retinal scan is not retained after it is processed to produce the retinal scan authentication data.

6. The method of claim 1 wherein the retinal scan is not transmitted off-contact-lens.

7. The method of claim 1 wherein storage of the retinal scan is lost when the electronic contact lens loses power.

8. The method of claim 1 wherein the other authentication data is related to the asset.

9. The method of claim 8 wherein the other authentication data comprises authentication data based on an ID of the asset.

10. The method of claim 9 further comprising:
- the electronic contact lens receiving the ID of the assets from off-contact-lens.

11. The method of claim 1 wherein the other authentication data is related to the electronic contact lens.

12. The method of claim 11 wherein the other authentication data comprises authentication data based on an ID of the electronic contact lens stored on the electronic contact lens.

13. The method of claim 11 wherein the other authentication data comprises authentication data based on an ID of the electronic contact lens and the ID of the electronic contact lens changes over time.

14. The method of claim 1 wherein authenticating the user's access to the asset comprises:
- accessing a database of which electronic contact lenses are registered to which users and to which assets; and
- authenticating the user's access based on comparing the combination authentication data against the database.

15. The method of claim 1 wherein the method occurs repeatedly while the user has access to the asset.

16. An authentication system comprising:
- an electronic contact lens comprising:
  - a retinal scanner that captures a retinal scan of the user's eye;
  - a processor that processes the retinal scan to produce retinal scan authentication data, combines the retinal scan authentication data with other authentication data to produce combination authentication data, and produces a hash function of the combination authentication data; and
  - a transmitter that transmits the hash function of the combination authentication data from the electronic contact lens to off-contact-lens for authentication; and
- an off-contact lens processor that authenticates the user's access to an asset based on the hash function of the combination authentication data; and authorizes access to the asset based on successful authentication of the user's access.

17. The authentication system of claim 16 wherein the electronic contact lens further:
- an outward-facing imager that captures at least some of the other authentication data.

18. The authentication system of claim 16 wherein processing the retinal scan to produce retinal scan authentication data is invariant to changes in orientation and lighting, and the processor in the electronic contact lens comprises a purpose-built ASIC that performs the invariant processing.

19. The authentication system of claim 16 wherein the processor in the electronic contact lens comprises a purpose-built ASIC that performs the hash function.

* * * * *